US012234116B2

(12) United States Patent
Carboni et al.

(10) Patent No.: US 12,234,116 B2
(45) Date of Patent: Feb. 25, 2025

(54) DEPALLETIZING MACHINE FOR PICKING UP AND MOVING GROUPS OF ARTICLES

(71) Applicant: G.D S.P.A., Bologna (IT)

(72) Inventors: Salvatore Carboni, Bologna (IT); Andrea Biondi, Bologna (IT); Antonio Vitali, Molinella (IT)

(73) Assignee: G.D S.P.A., Bologna (IT)

( * ) Notice: Subject to any disclaimer, the term of this patent is extended or adjusted under 35 U.S.C. 154(b) by 240 days.

(21) Appl. No.: 17/915,864

(22) PCT Filed: Apr. 1, 2021

(86) PCT No.: PCT/IB2021/052726
§ 371 (c)(1),
(2) Date: Sep. 29, 2022

(87) PCT Pub. No.: WO2021/198972
PCT Pub. Date: Oct. 7, 2021

(65) Prior Publication Data
US 2023/0129771 A1  Apr. 27, 2023

(30) Foreign Application Priority Data

Apr. 3, 2020  (IT) .................. 102020000007075

(51) Int. Cl.
*B65H 31/30* (2006.01)
*B62B 3/00* (2006.01)
(Continued)

(52) U.S. Cl.
CPC ......... *B65H 31/3063* (2013.01); *B62B 3/006* (2013.01); *B65G 1/14* (2013.01);
(Continued)

(58) Field of Classification Search
CPC ................ B65H 31/3063; B65H 5/006; B65H 2301/4224; B65H 2301/42264;
(Continued)

(56) References Cited

U.S. PATENT DOCUMENTS 2,815,209 A * 12/1957 Gulick ................. B65G 59/045
271/157
3,907,274 A *  9/1975 D'Amato ............. B65H 29/045
101/232
(Continued)

FOREIGN PATENT DOCUMENTS

DE  102008025565 A1  12/2009

OTHER PUBLICATIONS

International Search Report and Written Opinion dated Jul. 28, 2021 from counterpart International Patent Application No. PCT/IB2021/052726.

*Primary Examiner* — Gregory W Adams
(74) *Attorney, Agent, or Firm* — SHUTTLEWORTH & INGERSOLL, PLC; Timothy J. Klima (57) ABSTRACT

A depalletizing machine for picking up and moving groups of articles, specifically bundles of blanks, includes a containing structure internally provided with at least one receiving area for a movable magazine containing one or more groups of articles. The machine also includes at least one access opening for allowing the magazine to be inserted into, or removed from, the receiving area. The machine also includes a collection zone configured for receiving a succession of groups of articles from the movable magazine and for moving the groups of articles towards the outside of the machine. The machine also includes at least one sensor configured for detecting a position of the movable magazine within the at least one receiving area and a pickup head configured to pick up groups of articles from the movable magazine and transferring them into the collection zone. The (Continued)

machine also includes a control unit configured for setting a predetermined law of motion for the pickup head as a function of at least one information item obtained from the sensor, regarding the position of the movable magazine.

11 Claims, 6 Drawing Sheets

(51) Int. Cl.
  *B65G 1/14* (2006.01)
  *B65H 5/00* (2006.01)

(52) U.S. Cl.
  CPC ..... *B65H 5/006* (2013.01); *B65H 2301/4224* (2013.01); *B65H 2301/42264* (2013.01); *B65H 2701/1764* (2013.01)

(58) Field of Classification Search
  CPC .. B65H 2701/1764; B62B 3/006; B65G 1/14; B65G 59/02; B65G 61/00; B65G 59/00; B65B 43/145
  See application file for complete search history.

(56) References Cited

U.S. PATENT DOCUMENTS

| | | | | |
|---|---|---|---|---|
| 4,067,458 | A * | 1/1978 | Schneider | B65H 5/021 |
| | | | | 271/9.12 |
| 4,787,810 | A * | 11/1988 | Cawley | B65H 31/3045 |
| | | | | 414/789.5 |
| 4,854,815 | A * | 8/1989 | Augst | B65H 5/006 |
| | | | | 271/157 |
| 5,141,274 | A | 8/1992 | Hayden et al. | |
| 5,240,370 | A * | 8/1993 | Furukawa | B65H 31/24 |
| | | | | 101/37 |
| 5,683,220 | A * | 11/1997 | Oh | B62B 3/1476 |
| | | | | 414/536 |
| 5,882,174 | A * | 3/1999 | Woerner | B65G 60/00 |
| | | | | 414/795.8 |
| 5,971,692 | A * | 10/1999 | Rae | B65G 69/006 |
| | | | | 414/401 |
| 6,447,236 | B1 * | 9/2002 | Grams | B65G 47/90 |
| | | | | 414/265 |
| 7,726,460 | B2 * | 6/2010 | Neebe | B65G 65/00 |
| | | | | 198/346.2 |
| 7,806,644 | B2 * | 10/2010 | Yuyama | B65G 65/00 |
| | | | | 414/400 |
| 8,794,141 | B2 * | 8/2014 | Schaede | B41F 11/02 |
| | | | | 101/232 |
| 2010/0139511 | A1 | 6/2010 | Schaede | |
| 2011/0164954 | A1 * | 7/2011 | Capoia | B65H 7/02 |
| | | | | 414/796.5 |
| 2019/0152635 | A1 | 5/2019 | Morino et al. | |

* cited by examiner

DEPALLETIZING MACHINE FOR PICKING UP AND MOVING GROUPS OF ARTICLES

This application is the National Phase of International Application PCT/IB2021/052726 filed Apr. 1, 2021 which designated the U.S.

This application claims priority to Italian Patent Application No. 102020000007075 filed Apr. 3, 2020, which application is incorporated by reference herein.

TECHNICAL FIELD

This invention relates to a depalletizing machine and method for picking up and moving groups of articles, specifically bundles of blanks.

BACKGROUND ART

As is known, depalletizing machines comprise mechanical movement means, such as robotized arms, for example, which are configured for picking up a succession of groups of articles from a receiving area and moving the groups of articles towards a collection area.

These depalletizing machines require a high level of precision for the interaction between the robotized arm and the group of articles because gripping and picking up the individual articles from the group of articles must not create unwanted interference that might damage the articles and/or the robotized arm.

For this reason, depalletizing machines known in the prior art are extremely complex and characterized by very high production costs.

DISCLOSURE OF THE INVENTION

The aim of this invention is therefore to provide a depalletizing machine and method for picking up and moving groups of articles and which are very simple and inexpensive.

The aim specified is substantially achieved by a depalletizing machine and method for picking up and moving groups of articles and comprising the technical features set out in one or more of the appended claims. The dependent claims correspond to possible embodiments of the invention.

More specifically, the aim specified is substantially achieved by a depalletizing machine for picking up and moving groups of articles, specifically bundles of blanks, according to the invention. The machine comprises a containing structure, preferably in the shape of a box and/or a parallelepiped extending horizontally, internally provided with at least one receiving area for a movable magazine containing one or more groups of articles (for example, one or more bundles of blanks) and having at least one access opening for allowing the magazine to be inserted into the receiving area or removed from it after the group of articles has been picked up, wherein the operations by which the groups of articles are picked up are performed by a pickup head which is movable to an upper portion of the containing structure and configured to pick up groups of articles in succession from the magazine disposed in the respective receiving area and for transferring the groups of articles into the collection zone where they are moved towards the outside of the machine and/or towards a processing station. The depalletizing machine also comprises at least one sensor, configured for detecting a position of the movable magazine within the receiving area, and a control unit configured for setting a predetermined law of motion for the pickup head as a function of at least one information item obtained from the sensor, regarding the position of the movable magazine.

Preferably, the depalletizing machine is designed to interact with one or more vertical magazines, each mounted on a trolley configured to facilitate moving the magazine to and from the receiving area, for example, by moving it manually or, more preferably, automatically (using automated systems configured to move the magazine along predetermined paths or paths defined by the control unit).

Looking in more detail, the magazine comprises a plurality of vertical supports defining a channel where successions of evenly spaced groups of supporting elements, configured for supporting the undersides of respective groups of articles, operate. The magazine therefore contains groups of articles stacked above one another in such a way that a group of articles is separated from the one above it by a space of predetermined size configured to make it easier for the machine to extract the groups of articles from the magazine.

Preferably, the pickup head is movable in translation along two horizontal axes which are transverse, specifically perpendicular, to each other, and along a vertical axis about which the pickup head can preferably also rotate, for example, to better orient itself relative to the position of the groups of articles to be picked up.

According to an advantageous aspect of the invention, the pickup head is movable according to a predetermined law of motion as a function of the position of the magazine in the receiving area, where the position is detected by the aforementioned sensor. The control unit is able, as a function of the position of the magazine detected by the sensor, to set a suitable law of motion to allow the pickup head to follow an optimized path to reach the group of articles to be picked up.

In other words, after determining the position of the magazine in the receiving area, the control unit processes the information captured by the sensor regarding the position of the magazine itself and generates a specific law of motion for the pickup head, in particular by setting the final coordinates (in height in the horizontal plane and, where applicable, also rotationally about a vertical axis).

Advantageously, the possibility of generating a law of motion based on the position of the magazine considerably simplifies the machine, in that it does not need complex movement systems but only suitable actuators driven by the control unit, specifically through "open-loop" logic.

According to an aspect of the invention, the pickup head comprises a sensor (for example, an analogue sensor) configured to scan an area under the pickup head to check for the presence of the magazine and/or the presence of the group of articles on the magazine. That way, the pickup head can be moved at a higher speed when the pickup head is far from the groups of articles and slowed down only when it is near the groups of articles. This also allows checking for the presence/absence of the groups (magazine/channel loaded or empty), and to check for the presence of the group of articles picked up during transfer from the magazine to the collection zone.

According to an aspect of the invention, the pickup head is provided with a first pair of pickup elements facing each other and a second pair of pickup elements facing each other and configured to engage an underside surface of a group of articles to be picked up, specifically by encircling the group of articles from the outside.

Preferably, each pickup element of each pair comprises a vertical supporting bar and a lifting finger, at the bottom, adapted to be inserted under a group of articles to be picked up, that is to say, through the space between two groups of articles placed above each other.

Preferably, each pickup element has the shape of a C, with the two concavities facing each other, and still more preferably, the pickup elements of one pair each have the shape of a C whose concavity is deeper than that of the pickup elements of the other pair. Advantageously, pickup elements shaped this way allow picking up groups of articles having a complex shape in cross sectional plan, for example, having undercuts.

Preferably, to pick up groups of articles of different shapes and sizes without dismantling all or part of the pickup head, the pickup head comprises a retractor mechanism operating between the pickup elements of each pair to move the pickup elements of each pair according to an adjustment movement towards and away from each other along a first direction of movement.

Preferably, the retractor mechanism comprises a first and a second lead screw along which the pickup elements of the respective pairs move between a fully retracted position, where the pickup elements are located at the ends of the respective screws, and a closed position, where the pickup elements are close together half way along the screws.

More specifically, to enable the pickup elements of each pair to move towards and away from each other, the lead screws have a first, right-hand threaded portion and a second, left-hand threaded portion.

Preferably, the two pickup elements of each pair are adjustable towards and away from each other independently of the pickup elements of the other pair so as to allow picking up groups of articles whose shape in cross sectional plan is not constant in width or is "lobed", such as, for example, a cross shape or a T shape.

In other words, the pickup elements of the first pair can move towards or apart from each other to a different extent compared to the elements of the second pair.

The retractor mechanism thus makes it possible to adapt the pickup head quickly and easily to the shapes and sizes of the groups of articles to be picked up.

Advantageously, this retractor mechanism also allows adapting the pickup head based on the structure of the magazine, in particular, based on the position of the vertical supports defining the channel that contains the groups of articles, so as to prevent impacts or jamming between the head and the magazine.

For this purpose, the magazine is preferably designed in such a way that the means for supporting the groups of articles adopt a retracted position when the groups of articles immediately under them are picked up.

Looking in more detail, by retracted position is meant a position where the supporting means are aligned relative to the vertical supports that delimit the magazine, so as to make it easier to grip the groups of articles under the supporting means.

The movement of the supporting means towards the retracted position occurs when the supporting means come into abutment against a group of articles immediately under them and moving up along the channel of the magazine.

In other words, when it is time for the group of articles to be picked up from the magazine, the pickup head draws the group of articles out of the magazine with an upward movement along the channel of the magazine. During this movement, the group of articles impacts against the supporting means immediately above them (which are no longer supporting any group of articles) and causes them to adopt the retracted position.

To further enhance the versatility of the pickup head, the depalletizing machine also comprises a spacing mechanism for adjusting the distance between the pickup elements of the first pair and the pickup elements of the second pair, in particular along a second direction of movement which is transverse, preferably perpendicular, to the first direction of movement. Preferably, one of the pairs of pickup elements is fixed along the second direction of movement, whilst the other pair is movable along the second direction of movement. Preferably, the second direction of movement is also defined by a lead screw. More in detail, the threading of this lead screw is oriented in a single direction along the full length of the screw so as to enable the movable pair of pickup elements to move towards and away from the fixed pair of pickup elements.

Advantageously, adjusting the pickup elements of the first pair and the pickup elements of the second pair allows not only adapting the pickup head to groups of articles of any size but also to adapt the pickup head to the structure of the magazine so as to be able to position the pickup elements at alternate positions so they don't interfere with the vertical supports of the magazine during pickup operations.

Also an object of this invention is a method for picking up and moving groups of articles, specifically bundles of blanks, implemented by a machine having one or more of the features described in the foregoing.

The method comprises a step of inserting the movable magazine, containing stacked groups of articles, into a receiving area. The method also comprises the steps of detecting a position of the movable magazine within the receiving area, at least laterally, through the sensor located therein, and then, by means of the pickup head, picking up groups of articles in succession from the movable magazine and transferring them into the collection zone.

More specifically, the step of picking up and transferring the groups of articles is accomplished by setting a predetermined law of motion for the pickup head as a function of at least one information item obtained from the sensor, regarding the position of the movable magazine. Operatively, therefore, once the movable magazine has been positioned in the receiving area, the method comprises a step in which the pickup head is moved according to Cartesian translational motion in a horizontal plane along the upper portion of the containing structure until reaching a position above the movable magazine.

Preferably, this step is preceded by a step in which the spacing mechanism is driven in such a way as to position the pairs of pickup elements at a suitable distance in relation to the size of the group of articles to be picked up.

Once the head is at a position above the magazine, the method comprises a step of moving the pickup head closer to the magazine and bringing the fingers of the pickup elements to the same level as, or just below, the group of articles to be picked up. During this step, the pickup head may, if necessary, be rotated about the vertical axis to adapt its orientation to the position of the group of articles to be picked up.

Next, the control unit suitably drives the retractor mechanism so that the first and the second pair of pickup elements move closer together under the group of articles to be picked up.

The method also comprises a step of picking up the group of articles from the magazine by means of the pickup head. More specifically, in this step, the pickup head lifts the group of articles in the vertical direction all the way up along and out of the top of the magazine channel so that it can be transported towards the collection zone.

Advantageously, the fully adjustable structure of the pickup head allows the pickup operations to be performed without the pickup head interfering with the magazine and jamming.

Furthermore, the pickup head can be rotated about a vertical axis, for example, through an angle of 90° or 180°, to pick up groups of articles positioned in any way on the magazine. For example, the magazine can contain two or more juxtaposed stacks of groups of articles, where the two stacks are oriented in the same way or turned by 180° relative to each other in order to optimize magazine space.

Advantageously, the magazine structure also allows facilitating pickup operations: in particular, the retracted position of the supporting means that support the groups of articles prevents the fingers of the pickup elements from impacting against the groups of articles, causing the group of articles to fall or other unwanted effects.

Further features of the invention and its advantages are more apparent in the non-limiting description below, with reference to a preferred embodiment of a magazine for packs of blanks.

BRIEF DESCRIPTION OF THE DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

With reference to the accompanying drawings, the numeral 1 denotes a depalletizing machine for picking up and moving groups of articles S, specifically bundles of blanks, comprising a containing structure 2 internally provided with at least one receiving area 3 for a movable magazine M containing one or more groups of articles S, specifically bundles of blanks.

The machine 1 according to the invention is especially designed for moving groups of blanks intended for making three-dimensional containers, especially packages for loose products for the coffee market: for example, capsules or pods. More generally speaking, the invention is applicable to the production of containers for the following sectors: food, absorbent products, ceramic ware, tobacco and pharmaceutical industries, fine quality boxes or standard boxes intended to be sold empty.

Also, the term "blanks" is used to mean pieces of foldable material—for example, cardboard, cellulose, plastic or other materials—obtained by blanking or other similar process applied to a sheet or continuous web.

Figure 4:
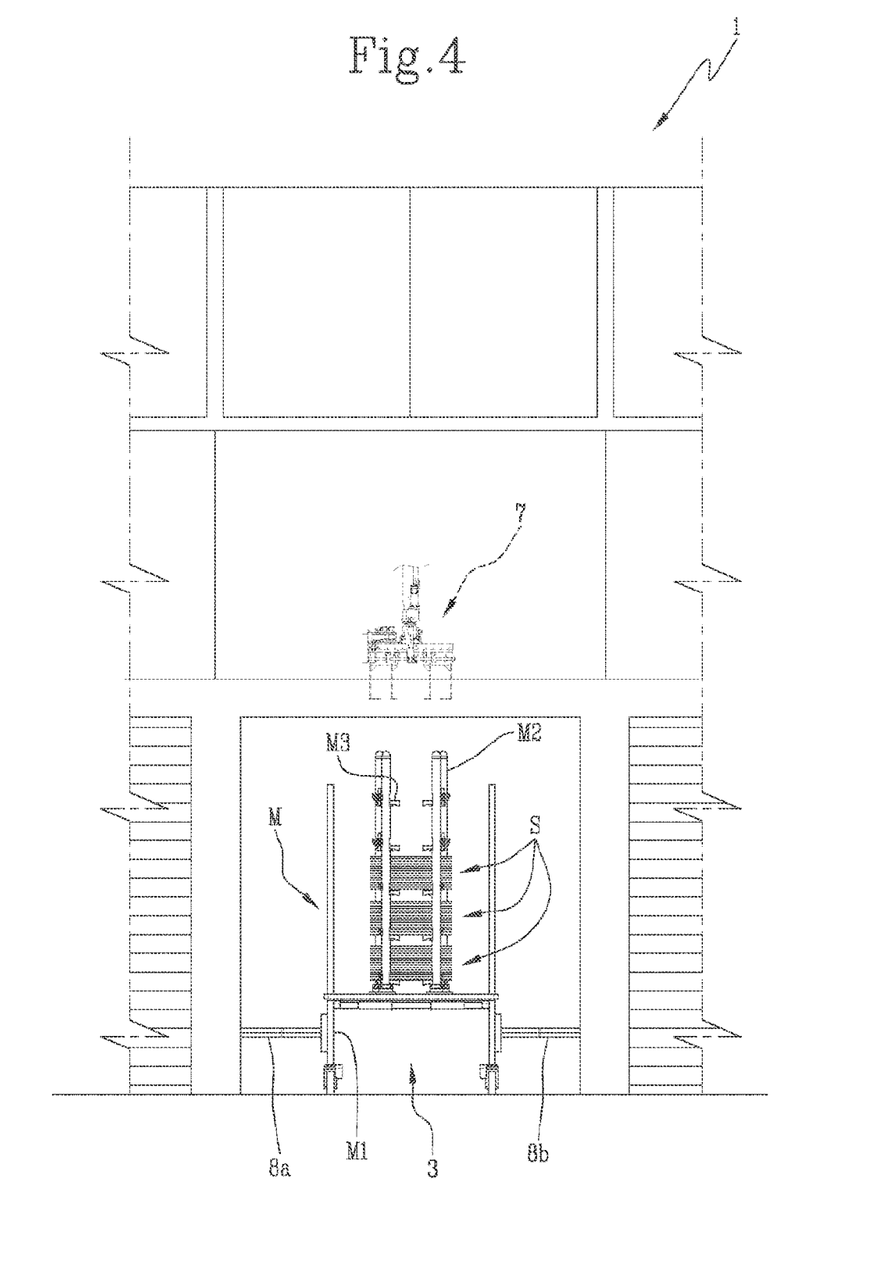
FIG. 4 shows a front view of a portion of the depalletizing machine of FIG. 1.

Preferably, as shown in FIG. 4, the receiving area 3 is configured to contain a vertical magazine comprising an automatic, self-propelled trolley M1, on which a plurality of vertical supports M2 are mounted to define one or more containing channels in which the groups of articles S are supported from below by specific supporting means M3 which allow them to be stacked one above the other at a predetermined spacing.

To allow the magazine M to be inserted into the receiving area 3 and to remove the magazine M from the receiving area 3 after the groups of articles S have been picked up, the depalletizing machine 1 also comprises at least one access opening 4.

In the embodiment illustrated in the accompanying drawings, the containing structure 2 is internally provided with a plurality of receiving areas 3, each having respective independent access openings 4 for receiving respective movable magazines M. In the specific embodiment, the receiving areas 3 are aligned along a predominant direction of extension of the machine 1; they might, however, be disposed in other configurations, not illustrated.

Figure 1:
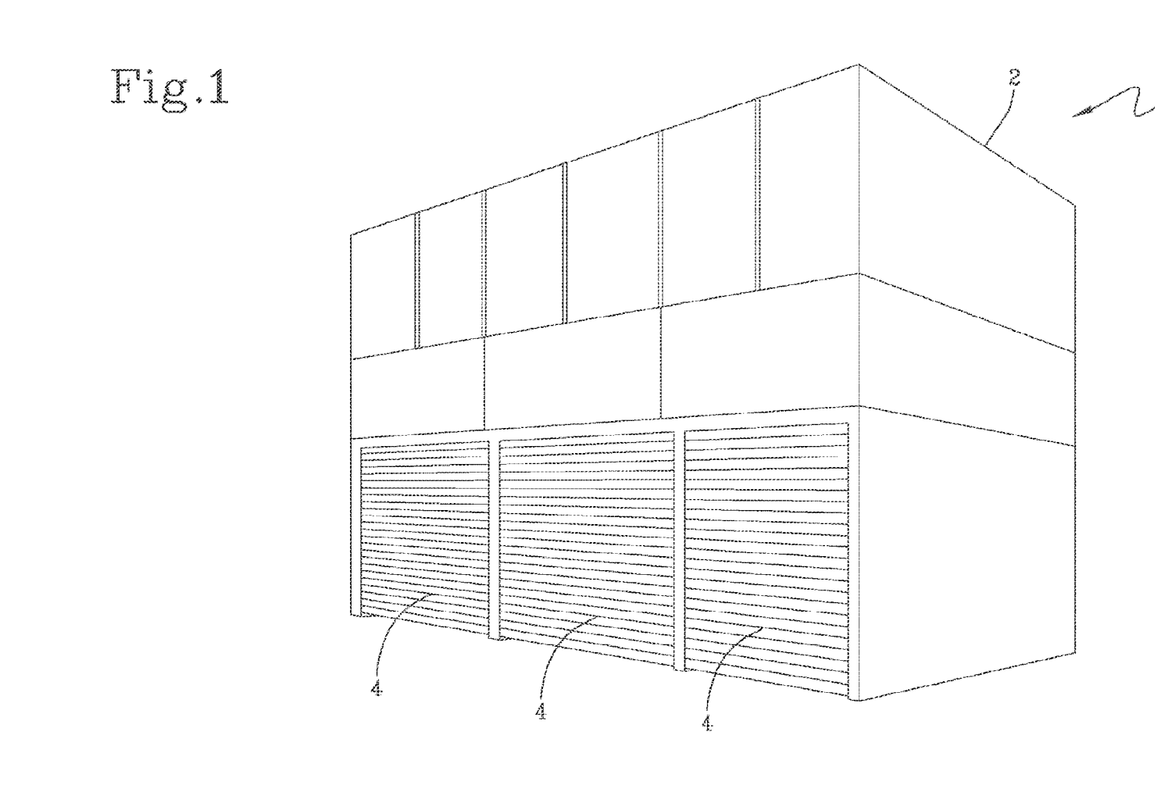
FIG. 1 shows a perspective view of a depalletizing machine of this invention.

Preferably, the access openings 4 of the receiving areas 3 are each provided with a door, shown in FIG. 1, openable independently of the others to allow a respective movable magazine M in and out. Preferably, the door may be a roll-up door or, alternatively, it may be of a type that opens by pivoting about a horizontal axis.

The depalletizing machine 1 may also comprise a collection zone 5 configured for receiving a succession of groups of articles S from the movable magazine M located in a respective receiving area 3 and for moving the groups of articles S towards the outside of the machine 1 and/or towards a processing station.

Figure 2:
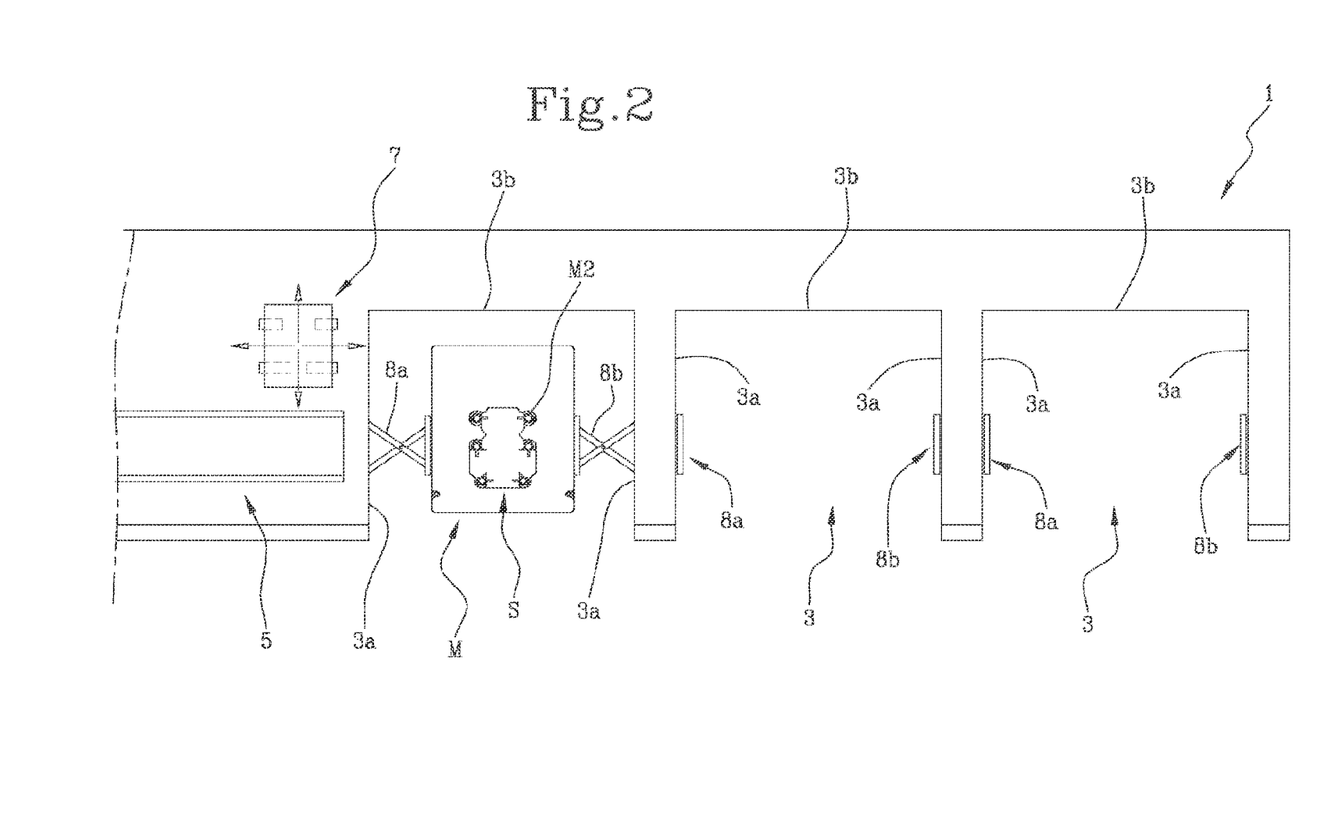
FIG. 2 is a plan view of the machine of FIG. 1.

In the embodiment illustrated in FIG. 2, the collection zone 5 is in the form of a belt conveyor or other straight conveyor with a top surface that moves in translation.

The collection zone 5 might be positioned adjacent to one of the receiving areas 3 or it might be made differently—for example, positioned at the bottom of the receiving areas 3, running along the predominant direction of extension of the machine 1. Furthermore, there might be a plurality of collection zones 5, for example, one for each receiving area 3.

Each receiving area 3 is preferably delimited at the side and the back by respective walls 3a, 3b or separator elements. Further, the receiving areas 3 are each provided with a pair of sensors (not illustrated) located laterally relative to the ingoing direction of the magazine M into the receiving area 3 through the access opening 4. Preferably, the sensors are located on the side walls 3a of each receiving area 3, possibly also on the bottom wall 3b.

The groups of articles S are moved from the magazines M to the collection zone 5 by means of at least one pickup head 7 which is movable in an upper portion of the containing structure 2 according to a predetermined law of motion, implemented in particular by a control unit (not illustrated). Preferably, there is only one pickup head 7, shared by all the receiving areas 3. However, in a variant embodiment in which there are a plurality of collection zones 5 or in which each receiving area 3 is associated with its own collection zone 5, there may be one pickup head 7 for each receiving area 3 and/or for each collection zone 5.

More in detail, the control unit is configured to receive from the sensors information relating to the position of the magazines M, specifically the lateral position (and, if necessary, also the longitudinal position) within the receiving areas 3 and to process the information to generate a suitable law of motion for the pickup head 7.

Preferably, the control unit is configured for setting the predetermined law of motion for the pickup head 7 according to an open loop logic whereby the control unit determines a final spatial position to be assigned to the pickup head 7 when picking up at least one group of articles S from the movable magazine M.

More specifically, the control unit determines the spatial position to be assigned to the pickup head 7 as a function of the information it receives from the sensors regarding the position of the movable magazines M.

Advantageously, the possibility of varying the law of motion of the pickup head 7 based on the position of the magazines M in the receiving areas 3 allows speeding up the entire process of picking up the groups of articles S, by making it possible to prevent wasting time in unnecessary movements of the pickup head 7 and to simplify the process and make it economically advantageous.

Operatively, therefore, one or more movable magazines M containing groups of articles S stacked one above the other are inserted into respective receiving areas 3. In each receiving area 3, the sensors detect the lateral position of the magazine M and transmit the information to the control unit, which sets a predetermined law of motion for the pickup head 7 as a function of that information.

Preferably, the control unit can plan the law of motion for the pickup head 7 also taking into account the user's specific needs such as, for example, preferences relating to the orientation the groups of articles S should have when they are released into the collection area 5 or preferences relating to the order in which they are picked up in the different receiving areas 3.

Once the law of motion has been processed, the pickup head 7 is moved between the magazines M of the different receiving areas 3 in such a way as to pick up the groups of articles S according to the predetermined order set by the control unit.

Preferably, the pickup head 7 is moved in translation along two horizontal axes X, Y, transverse to each other—defined, for example, by a gantry structure—until it is positioned above the magazine M.

Preferably, where necessary, the pickup head 7 is also rotated about a vertical axis Z, perpendicular to the two horizontal axes X, Y, if its orientation is not compatible with the orientation of the group of articles S to be picked up. More specifically, the rotation may be correlated with the way the groups of articles S are arranged in the magazine M, for example, in the case where the magazine M contains two or more stacks of groups of articles in which the articles of one stack are positioned at 90° or 180° relative to the articles of another stack.

Next, the pickup head 7 is lowered along the vertical axis Z towards the magazine M below to reach the level where the groups of articles S to be picked up are located.

To perform the pickup operation, the pickup head 7 comprises at least a first pair of facing pickup elements 7a, 7b and a second pair of facing pickup elements 7c, 7d acting in conjunction with the pickup elements of the first pair 7a, 7b to engage an underside surface of the groups of articles S to be picked up from the movable magazine M in such a way as to support the groups of articles S as they are being moved from the movable magazine M to the collection area 5.

In this situation, each of the pickup elements 7a, 7b, 7c, 7d is inserted into the vertical space between the group of articles S to be picked up and the group of articles S below it so that the group of articles S to be picked up can be lifted out along the containing channel of the magazine M.

Preferably, during pickup operations, to prevent impacts and/or jams between the pickup elements 7a, 7b, 7c, 7d and the structure of the magazine M, the magazine M is configured in such a way that the supporting means M3 adopt a retracted position, specifically a recessed position within the vertical supports M2 after the passing of an underlying group of articles S during a step of extracting. More specifically, while a group of articles S is being picked up, it strikes the supporting means M3 just above it, causing them to move to the recessed position.

Advantageously, the movability of the supporting means M3 prevents the pickup elements 7a, 7b, 7c, 7d of the pickup head 7 from being interfered with by the supporting means M3, now free of the groups of articles S.

Figure 5A:
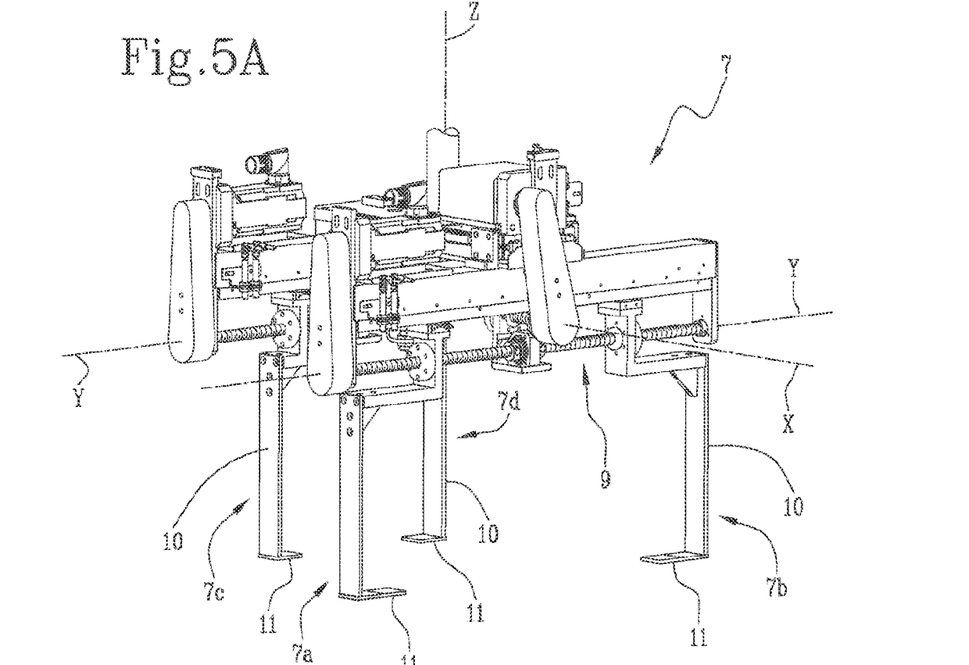
FIGS. 5A-5B show perspective views of a component of the machine of this invention.

To get a hold of the group of articles, the pickup head 7, as shown in FIG. 5A, also comprises a retractor mechanism 9 operating between the pickup elements 7a, 7b, 7c, 7d of each pair, so as to move the pickup elements 7a, 7b, 7c, 7d of each pair according to an adjustment movement towards and away from each other along a first direction of movement. In an embodiment not illustrated, the two pairs of pickup elements 7a, 7b, 7c, 7d may define two distinct directions of non-parallel movements.

Preferably, the two pickup elements 7a, 7b, 7c, 7d of each pair are adjustable independently of the pickup elements 7a, 7b, 7c, 7d of the other pair.

Figure 5B:
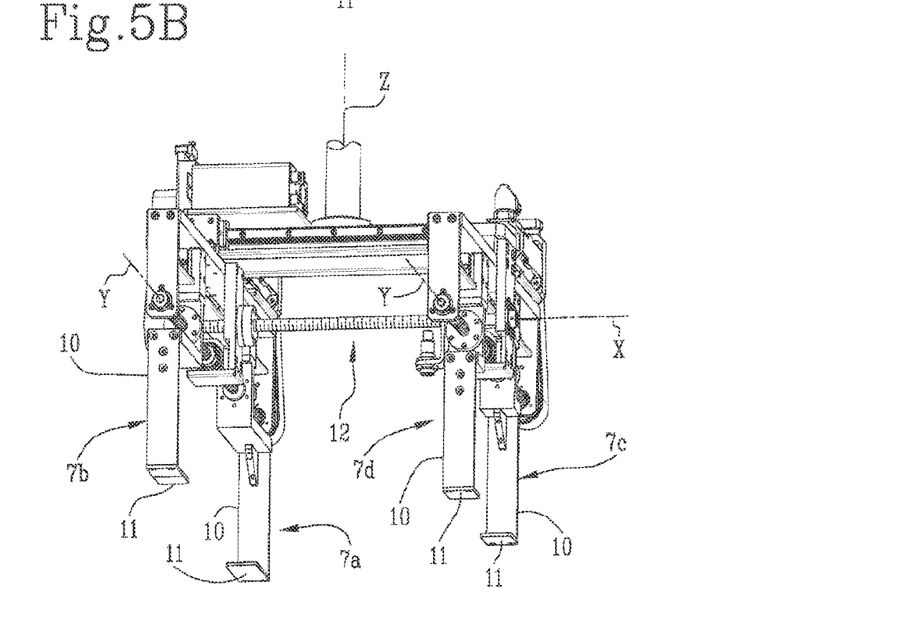

Preferably, as shown in FIGS. 5A and 5B, the pickup elements 7a, 7b, 7c, 7d each comprise a supporting bar 10, preferably vertical, connected at the top to the retractor mechanism 9 and having, at the bottom, a horizontal lifting finger 11 designed to be inserted under a group of articles S to be picked up.

Preferably, the pickup elements 7a, 7b, 7c, 7d each have the shape of a C, oriented in such a way that the concavities of the two pickup elements 7a, 7b, 7c, 7d of each pair face each other. Still more preferably, in the pickup elements 7a, 7b, 7c, 7d of one of the pairs, the concavity is deeper than it is in the pickup elements 7a, 7b, 7c, 7d of the other pair, so as to engage a wider portion of the groups of articles S.

Figure 6:
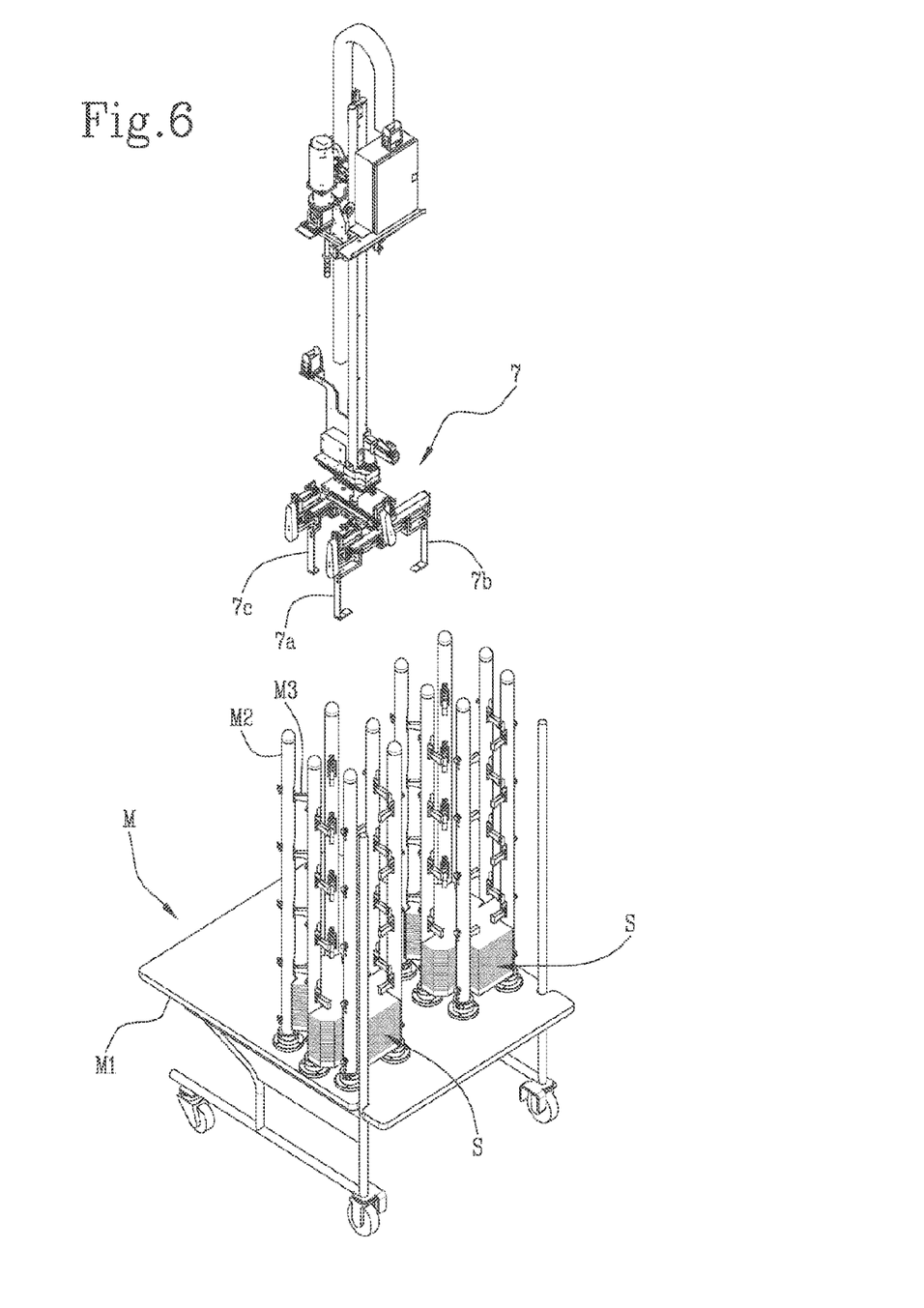
FIG. 6 shows a perspective view of a preliminary operating step performed by parts of the machine of the invention.

In use, therefore, once the pickup head 7 has reached a position above the magazine M (or alternatively, before or while reaching the positon above the magazine M) shown, for example, in FIG. 6, the pickup elements 7a, 7b, 7c, 7d are moved away from each other to allow the pickup head 7 to move down along the magazine until it reaches the level where the group of article S to be picked up is located. Preferably, as the pickup head 7 moves down, the pickup elements 7a, 7b, 7c, 7d are retracted in such a way as to occupy a position on the outside of the channel defined by the vertical supports M2 of the magazine M.

The pickup elements 7a, 7b, 7c, 7d are then moved back towards each other so that the respective lifting fingers 11 are inserted under the group of articles S to be picked up.

In the embodiment illustrated in the accompanying drawings, the pickup elements 7a, 7b of the first pair make a movement towards each other that is smaller than the movement towards each other made by the pickup elements 7c, 7d of the second pair. In effect, in the embodiment illustrated in the accompanying drawings, the cross sectional plan shape of the groups of articles S to be picked up is substantially like a cross in which the pickup elements 7a, 7b of the first pair support a portion of the group of articles that is less wide than the portion supported by the pickup elements 7c, 7d of the second pair.

Advantageously, adjusting the pairs of pickup elements 7a, 7b, 7c, 7d independently of each other allows the pickup head 7 to engage groups of articles S having a cross section of any shape.

Furthermore, adjusting the pairs of pickup elements 7a, 7b, 7c, 7d independently of each other allows supporting the groups of articles S at specific points of their cross section, such as, for example, the points most subject to bending or points having particularly complex shapes.

To make the pickup head 7 even more versatile in terms of the size and/or shape of the groups of articles S to be picked up, the pickup head 7 is also provided with a spacing mechanism 12 for adjusting the distance between the pickup elements 7a, 7b of the first pair and the pickup elements 7c, 7d of the second pair.

More specifically, this adjustment is along a second direction of movement, transverse, preferably perpendicular, to the first direction of movement. Preferably, one of the pairs of pickup elements 7a, 7b, 7c, 7d is fixed along the second direction of movement (that is, fixed to the load-bearing structure of the pickup head 7), while the other pair of pickup elements 7a, 7b, 7c, 7d is movable.

Advantageously, this adjustment mechanism 12 makes the pickup head 7 more adaptable to groups of articles S of any type.

Preferably, the pickup head 7 also comprises a downwardly facing sensor, not illustrated (for example, an analogue sensor) configured to scan an area under the pickup head 7 to check for the presence of the magazine M and/or the presence of the group of articles on the magazine M. That way, the pickup head 7 can be moved at a higher speed when the pickup head 7 is far from the groups of articles (rapid approach movement) and slowed down only when it is near the groups of articles (gripping movement). This feature also makes the pickup head 7 capable of automatically detecting the height at which the top group of articles in the magazine M is located, which may vary according to how full the magazine M is, and for optimizing process times while working in conditions of utmost safety.

This also allows checking for the presence/absence of the groups (magazine/channel loaded or empty), and to check (by continuous monitoring) for the presence of the group of articles picked up during transfer from the magazine to the collection zone (to ensure that no load has been lost in transit (and preferably generating an alarm signal if there has).

To make the most of the versatility and flexibility of the pickup head 7 and to further maximize the process of picking up the groups of articles S from the movable magazines M, the machine 1 also comprises control mechanisms for controlling the position of the movable magazines M in the receiving areas 3.

To enable the movable magazines M to adopt a predetermined position inside the respective receiving area 3 so that the pickup head 7 can operate precisely, the control unit is configured to disable the movement of the pickup head 7 and preferably to generate an alarm signal when the information regarding the position of the movable magazine M indicates that the movable magazine M is at a position that is outside a predetermined tolerance.

More in detail, the signal indicating that the magazine M is incorrectly positioned relative to the predetermined tolerance comes from the sensors mounted in each receiving area 3.

The sensors are preferably optical sensors and are configured to measure a distance between the movable magazine M and a respective side wall 3a delimiting the receiving area 3. If these distances fall within the predetermined tolerance, the pickup head 7 is operated normally so it picks up the group of articles S from the magazine M and moves it towards the collection area 5 according to the method described above. On the other hand, if the distances are outside the predetermined tolerance, the pickup head 7 is not moved and the movable magazine M is repositioned manually by an operator or automatically.

Preferably, the movable magazine M is moved back into a position within the receiving area 3 manually if it is outside the tolerance by a long way.

Instead, if the position adopted by the magazine differs only a little from the correct position, it is repositioned automatically or locked at its position by activating push bars which are configured to engage the side of the magazine M, specifically to push the magazine M towards or away from the side walls 3a of the receiving area 3, or to lock the side of the magazine M in position, respectively.

The machine 1 may also comprise at least one proximity sensor (not illustrated) mounted in a bottom wall 3b delimiting the receiving area 3 and configured to issue a signal when the movable magazine M is at a predetermined distance from the bottom wall 3b.

Advantageously, the proximity sensor prevents the magazine from being pushed too far into the receiving area 3 and making it difficult or even impossible for the pickup head 7 to carry out pickup operations.

In another embodiment, alternatively to the bottom sensor, the receiving area 3 comprises a mechanical stop member which stops the trolley M1 of the magazine M when it reaches the end of its stroke in the receiving area 3.

In use, therefore, when the magazine M is placed inside the receiving area 3, the sensors are activated in order to detect whether or not the position of the movable magazine M falls within a predetermined tolerance. If it does, the information regarding the position of the magazine M is sent to the control unit so it can process the law of motion for the pickup head 7 and adjust the pickup elements 7a, 7b, 7c, 7d. If it doesn't, on the other hand, the magazine M is repositioned within the receiving area 3 manually or automatically.

Advantageously, thanks to the sensors mounted in the receiving areas 3, the pickup head 7 does not make unnecessary movements towards receiving areas 3 whose magazines M are badly positioned and from which it would be unable to pick up the groups of articles S they contain.

Advantageously, pickup cycle times are considerably reduced because while one magazine M is being moved to the correct position inside a receiving area 3, another magazine M may be emptied by the pickup head 7 without having to stop the machine.

To prevent the movable magazine M from moving after it has adopted the predetermined position, the machine 1 also comprises a retaining device, located inside each receiving area 3 and configured to lock the movable magazine M at that position in the receiving area 3.

Figure 3A:
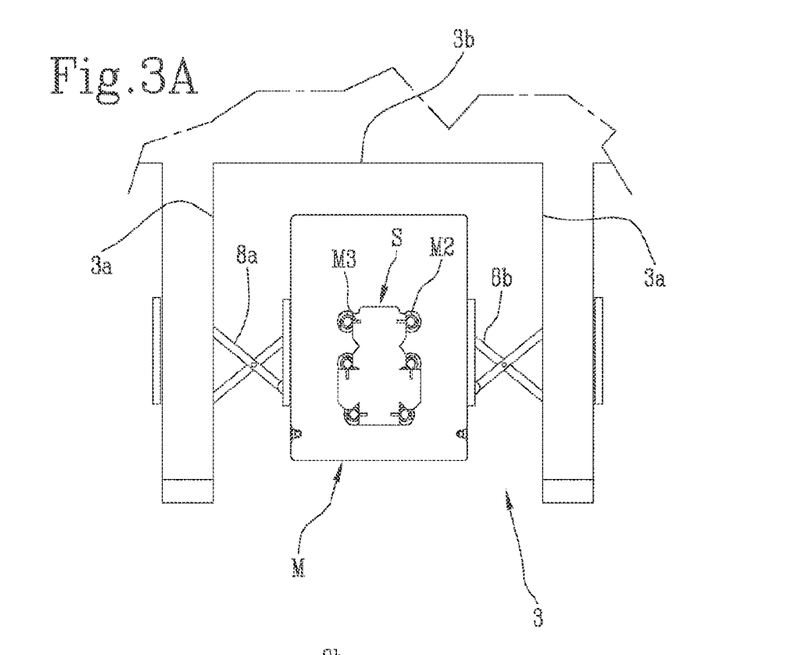
FIGS. 3A-3B show respective plan views of a portion of the machine in different operating configurations.
Figure 3B:
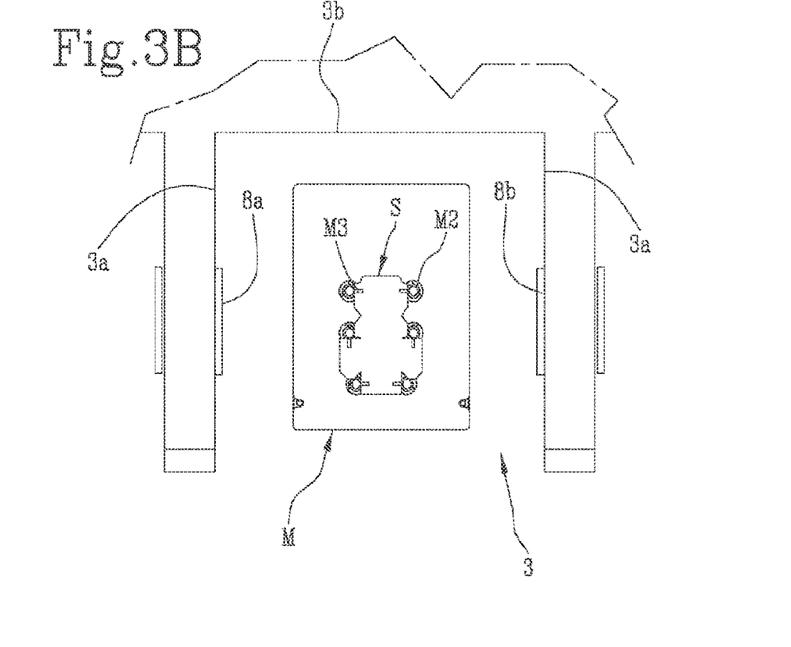

As shown in FIGS. 3A and 3B, the retaining device comprises a first pushing element 8a and a second pushing element 8b, located on opposite sides 3a of the receiving area 3 and movable relative to each other between an active position and a withdrawn position.

At the active position, the first and second pushing elements 8a, 8b extend towards the centre of the receiving area 3 and engage respective side portions of the movable magazine M to prevent the magazine from moving further.

At the rest position, on the other hand, the first and second pushing elements 8a, 8b adopt a withdrawn position and are disengaged from the respective side portions of the movable magazine M to allow the movable magazine M in and out of the receiving area 3.

Operatively, the first and second pushing elements 8a, 8b are activated by the control unit after the position of the magazine M in the receiving area 3 has been detected by the first and the second sensor.

However, if the first and second sensors detect that the magazine M is badly positioned, the control unit disables the movements of the first and second pushing elements 8a, 8b and preferably generates an alarm signal.

In the preferred embodiment, if the incorrect position of the magazine M differs just a little from a predetermined tolerance, the control unit nevertheless moves the first and second pushing elements 8a, 8b from the rest position to the active position in order to correct the position of the movable magazine by a pushing action of the first and/or the second pushing element 8a, 8b on the trolley M1 of the magazine M.

In other words, in the embodiment illustrated in the accompanying drawings, if the magazine M is badly positioned, repositioning is carried out automatically by the first and the second pushing element 8a, 8b imparting a sideways push on the trolley M1 of the movable magazine M so that the distances between the magazine M and the side walls 3a of the receiving area 3 are all the same or, in any case, within a predetermined range of values. In this situation, the first and the second pushing element 8a, 8b impact against the trolley M1 of the magazine M to correct its position within the receiving area 3 and then lock the magazine M at the predetermined position.

In the embodiment shown in the accompanying drawings, the first and the second pushing element 8a, 8b comprise articulated pantograph arms which, at the withdrawn position, are preferably fully recessed in the side wall 3a of the receiving area 3.

In another embodiment not illustrated, the first and second pushing elements 8a, 8b comprise push bars.

The invention achieves the above-mentioned aims by eliminating the drawbacks of the prior art.

The presence of two or more receiving areas allows the pickup head to work on one magazine while another is being fed.

The pickup point of the pickup head changes according to the receiving area, leaving other parts of the machine unencumbered.

As each group of blanks is withdrawn from the magazine, access to those below is made possible.

The possibility of controlling the law of motion of the pickup head 7 optimizes the machine and makes it fast and able to avoid "wasted" movements, that is, movements in which no group of articles S is picked up from the magazines M.

The presence of sensors configured to check the position of the magazine M in the receiving area 3 contributes to speeding up and optimizing the pickup process.

The possibility of adjusting the mutual position of the pickup elements 7a, 7b, 7c, 7d allows managing groups of articles S having different shapes and sizes in cross sectional plan, without having to dismantle all or part of the pickup head 7.

Advantageously, the pickup head 7 acts in conjunction with the magazine M described above, specifically with the pan-supporting means M3, in such a way as to prevent it from impacting in any way against the magazine M itself or the groups of articles S to be picked up.

The invention claimed is:

1. A depalletizing machine for picking up and moving groups of articles, including bundles of blanks, comprising:
a containing structure internally provided with at least one receiving area for at least one movable magazine containing one or more groups of articles, including one or more bundles of blanks;
at least one access opening for allowing the magazine to be inserted into the at least one receiving area and for removing the magazine from the at least one receiving area;
at least one collection zone configured for receiving a succession of the one or more groups of articles from the at least one movable magazine disposed in the at least one receiving area and for moving the one or more groups of articles towards the outside of the machine and/or towards a processing station;
at least one sensor configured for detecting a position of the at least one movable magazine within the at least one receiving area;
a pickup head movable to an upper portion of the containing structure and configured to pick up the one or more groups of articles in succession from the at least one movable magazine disposed in the at least one receiving area and for transferring the one or more groups of articles into the at least one collection zone;
a control unit configured for setting a predetermined law of motion for the pickup head as a function of at least one information item obtained from the at least one sensor, regarding the position of the at least one movable magazine,
the at least one receiving area including a plurality of receiving areas and the containing structure internally including the plurality of receiving areas for respective movable magazines of the at least one movable magazine, the plurality of receiving areas each having a respective independent access opening of the at least one access opening and being disposed in sequence along a direction of juxtaposition, and wherein the pickup head is configured to transfer the one or more groups of articles from the plurality of receiving areas to the at least one collection zone;
a plurality of retaining devices respectively disposed one each in each of the plurality of receiving areas and configured to lock the at least one movable magazine at a predetermined position within the each of the plurality of receiving areas, wherein each of the plurality of retaining devices comprises a first pushing element and a second pushing element disposed on opposite sides of the each of the plurality of receiving areas and mutually movable between an active position in which the first and second pushing elements extend towards a center of the each of the plurality of receiving areas and engage respective side portions of the at least one movable magazine to prevent further movement of the at least one movable magazine, and a rest position in which the first and second pushing elements adopt a withdrawn position and are disengaged from the respective side portions of the at least one movable magazine to allow the at least one movable magazine in and out of the each of the plurality of receiving areas, the first and second pushing elements comprising pantograph configuration articulated arms.

2. The machine according to claim 1, wherein the control unit is configured for setting the predetermined law of motion for the pickup head according to an open loop logic, the control unit being, configured for determining, as a function of the at least one information item regarding the position of the at least one movable magazine, a spatial position to be assigned to the pickup head when picking up at least one group of articles from the at least one movable magazine.

3. The machine according to claim 1, wherein the at least one sensor comprises, for each of the plurality of receiving areas, a first sensor and a second sensor configured to measure a distance between the at least one movable magazine and a respective side wall delimiting the each of the plurality of receiving areas, the first and second sensors being optical sensors.

4. The machine according to claim 1, wherein the control unit is configured to disable the movement of the pickup head and to generate an alarm signal when the at least one information item regarding the position of the at least one movable magazine indicates that the at least one movable magazine is at a position that is outside a predetermined tolerance.

5. The machine according to claim 1, wherein the control unit is configured to disable the movement of the first and second pushing elements and preferably to generate an alarm signal when the at least one information item regarding the position of the at least one movable magazine indicates that the at least one movable magazine is at a position that is outside a predetermined tolerance.

6. The machine according to claim 1, wherein the pickup head is movable in translation along two horizontal axes which are transverse to each other, and along a vertical axis, and wherein the pickup head is also movable in rotation about the vertical axis.

7. The machine according to claim 1, wherein the pickup head comprises at least a first pair of pickup elements facing each other and a second pair of pickup elements facing each other and acting in conjunction with the first pair of pickup elements to engage an underside surface of one of the one or more groups of articles supported by the at least one movable magazine to support the one of the one or more groups of articles while the at least one movable magazine is being moved to the at least one collection zone, and wherein the pickup head comprises a retractor mechanism operating between the pickup elements of each of the first pair and the second pair to move the pickup elements of each of the first pair and the second pair according to an adjustment movement towards and away from each other along a first direction of movement, the pickup elements of each of the first pair and the second pair being adjustable independently of the pickup elements of the other of the first pair and the second pair.

8. The machine according to claim 7, wherein each of the pickup elements comprises a vertical supporting bar, connected at a top to the retractor mechanism and, at a bottom, including a lifting finger adapted to be inserted under the one of the one or more groups of of articles to be picked up, each of the pickup elements being C-shaped and the pickup elements of one of the first pair and the second pair having the C-shape with a concavity deeper than a concavity of the C-shape of the pickup elements of the other of the first pair and the second pair, to engage a wider portion of the one of the one or more groups of articles.

9. The machine according to claim 7, and further comprising a spacing mechanism configured for adjusting a distance between the pickup elements of the first pair and the pickup elements of the second pair, along a second direction of movement which is transverse, to the first direction of movement, one of the first pair and the second pair of pickup elements being fixed along the second direction of movement.

10. A method for picking up and moving groups of articles, including bundles of blanks, comprising:
providing a depalletizing machine for picking up and moving groups of articles, including bundles of blanks, comprising:
a containing structure internally provided with at least one receiving area for at least one movable magazine containing one or more groups of articles, including one or more bundles of blanks;
at least one access opening for allowing the magazine to be inserted into the at least one receiving area and for removing the magazine from the at least one receiving area;
at least one collection zone configured for receiving a succession of the one or more groups of articles from the at least one movable magazine disposed in the at least one receiving area and for moving the one or more groups of articles towards the outside of the machine and/or towards a processing station;
at least one sensor configured for detecting a position of the at least one movable magazine within the at least one receiving area;
a pickup head movable to an upper portion of the containing structure and configured to pick up the one or more groups of articles in succession from the at least one movable magazine disposed in the at least one receiving area and for transferring the one or more groups of articles into the at least one collection zone;
a control unit configured for setting a predetermined law of motion for the pickup head as a function of at least one information item obtained from the at least one sensor, regarding the position of the at least one movable magazine,
the at least one receiving area including a plurality of receiving areas and the containing structure internally including the plurality of receiving areas for respective movable magazines of the at least one movable magazine, the plurality of receiving areas each having a respective independent access opening of the at least one access opening and being disposed in sequence along a direction of juxtaposition, and wherein the pickup head is configured to transfer the one or more groups of articles from the plurality of receiving areas to the at least one collection zone;
inserting the at least one movable magazine into one of the plurality of receiving areas, the at least one movable magazine carrying the one or more groups of articles;
detecting the position of the at least one movable magazine within the one of the plurality of receiving areas with the at least one sensor;
picking up the one or more groups of articles in succession from the at least one movable magazine disposed in the one of the plurality of receiving areas and transferring the one or more groups of articles into the at least one collection zone with the pickup head;
wherein the step of picking up and transferring the one or more groups of articles is accomplished by setting the predetermined law of motion for the pickup head as the function of the at least one information item regarding the position of the at least one movable magazine obtained from the at least one sensor, through an open loop control logic, and wherein the step of inserting the at least one movable magazine into the one of the plurality of receiving areas is accomplished using an automatic, self-propelled trolley.

11. A depalletizing machine for picking up and moving groups of articles, including bundles of blanks, comprising:
- a containing structure internally provided with at least one receiving area for at least one movable magazine containing one or more groups of articles, including one or more bundles of blanks;
- at least one access opening for allowing the magazine to be inserted into the at least one receiving area and for removing the magazine from the at least one receiving area;
- at least one collection zone configured for receiving a succession of the one or more groups of articles from the at least one movable magazine disposed in the at least one receiving area and for moving the one or more groups of articles towards the outside of the machine and/or towards a processing station;
- at least one sensor configured for detecting a position of the at least one movable magazine within the at least one receiving area;
- a pickup head movable to an upper portion of the containing structure and configured to pick up the one or more groups of articles in succession from the at least one movable magazine disposed in the at least one receiving area and for transferring the one or more groups of articles into the at least one collection zone;
- a control unit configured for setting a predetermined law of motion for the pickup head as a function of at least one information item obtained from the at least one sensor, regarding the position of the at least one movable magazine,
- the at least one receiving area including a plurality of receiving areas and the containing structure internally including the plurality of receiving areas for respective movable magazines of the at least one movable magazine, the plurality of receiving areas each having a respective independent access opening of the at least one access opening and being disposed in sequence along a direction of juxtaposition, and wherein the pickup head is configured to transfer the one or more groups of articles from the plurality of receiving areas to the at least one collection zone;
- wherein the pickup head comprises at least a first pair of pickup elements facing each other and a second pair of pickup elements facing each other and acting in conjunction with the first pair of pickup elements to engage an underside surface of one of the one or more groups of articles supported by the at least one movable magazine to support the one of the one or more groups of articles while the at least one movable magazine is being moved to the at least one collection zone, and wherein the pickup head comprises a retractor mechanism operating between the pickup elements of each of the first pair and the second pair to move the pickup elements of each of the first pair and the second pair according to an adjustment movement towards and away from each other along a first direction of movement, the pickup elements of each of the first pair and the second pair being adjustable independently of the pickup elements of the other of the first pair and the second pair.

* * * * *